March 31, 1931.  H. E. DEPUTY  1,798,458
PISTON RING
Filed Sept. 12, 1927
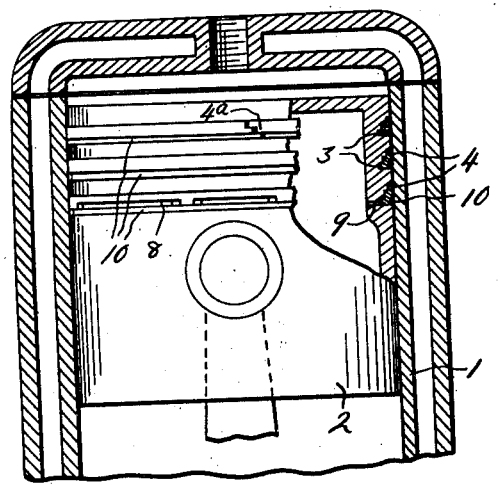
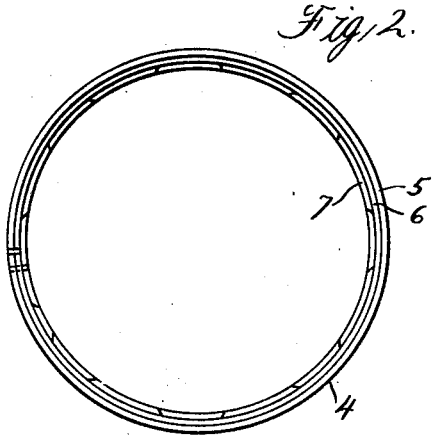
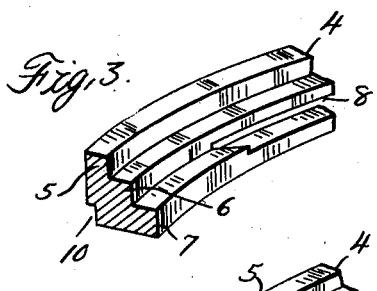
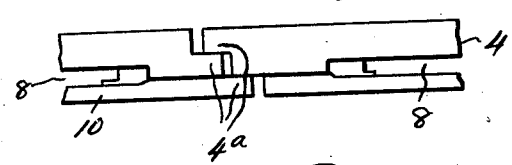
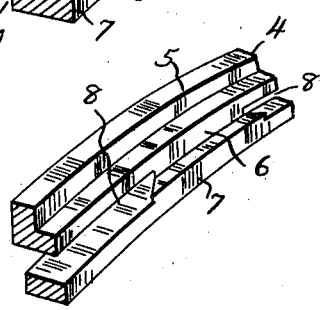
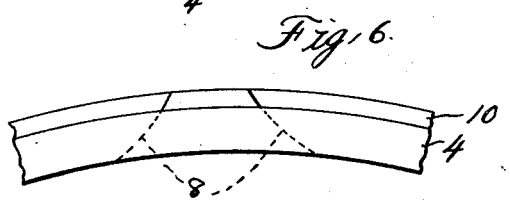
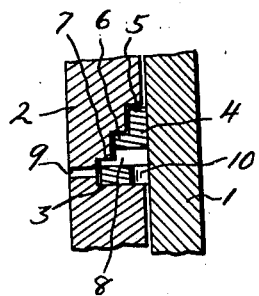
Inventor
Horace E. Deputy
By Swan, Frye, & Murray
Attorneys Patented Mar. 31, 1931

1,798,458

UNITED STATES PATENT OFFICE

HORACE E. DEPUTY, OF LONG BEACH, WASHINGTON

PISTON RING

Application filed September 12, 1927. Serial No. 219,019.

This invention relates to piston rings and particularly to piston rings for internal combustion engine use.

An object of the invention is to mount a piston ring upon a piston working in a cylinder without initial compression of the ring by contact with the cylinder wall and to admit compressed gases into the piston ring groove on the pressure and explosion strokes of the piston to expand said ring into sealing engagement with the cylinder wall solely by the outward pressure of such gases.

Another object of the invention is to form a piston ring with one or more slots extending substantially radially through said ring and providing for the positive discharge into the inner portion of a piston carrying said ring of such excess lubricant as accumulates adjacent to said ring.

Still another object is to cut away the outer face of the aforesaid piston ring between said slots and the edge of the ring remote from the combustion chamber to facilitate the delivery of lubricant from in advance of said ring through said slots, on the down stroke of the piston.

These and various other objects the invention attains by the construction hereinafter described and illustrated in the accompanying drawing, wherein:

Figure 1 is a vertical sectional view of an engine cylinder and piston, the latter of which is equipped with sealing rings embodying the herein-disclosed features.

Figure 2 is a top view of one of said rings.

Figures 3 and 4 are fragmentary perspective views of said ring.

Figure 5 is a fragmentary side view of the ring showing the overlapped split ends thereof.

Figure 6 is a fragmentary bottom view of another portion of said ring.

Figure 7 is a fragmentary enlargement of a portion of Figure 1, showing in cross section the ring nearest to the crank case and the adjacent portions of the piston and cylinder walls.

In these views the reference character 1 designates an internal combustion engine cylinder, and 2 a piston working in said cylinder, and having annular grooves 3 receiving split sealing rings 4, having their ends overlapped. Diverging from common practice, said overlapped ends form a series of interfitting steps 4a which minimize leakage by compelling any gases flowing between said ends to make at least four right angle turns. The number of such rings used in any piston may be suited to the particular installation, three being shown in the disclosed embodiment of the invention. The inner face of each ring is machined to form annular steps or offsets 5, 6, 7 and the bottoms of the piston grooves receiving said rings are correspondingly machined, as is best seen in Figure 7. The arrangement is preferably such as to form a slight clearance between the stepped bottom face of each groove and the stepped inner face of the corresponding ring, when the latter is expanded, and also provides a slight clearance between the stepped end face of each ring and the corresponding wall of each groove. This facilitates admission of gases between the piston and ring when such gases are under compression in the combustion chamber. The effect of the described stepped construction is to increase the sealing efficiency of the rings and maintain a higher compression co-efficient than is permitted by rings of the usual rectangular cross-section.

In the practice heretofore common, the maintenance of a sealing engagement of the piston rings of internal combustion engines with the cylinders of said engines has been achieved primarily by forming the rings of a normal diameter exceeding that of the cylinder bore, thus necessitating a certain compression of the rings upon their insertion in said bore and creating an expansive pressure of said rings upon the wall of said bore. Such practice has necessitated the employment of rings sufficiently heavy to resiliently exert the desired sealing pressure upon the cylinder wall, and in some instances such rings have been tapered from their mid-portions to their ends. The present construction diverges from such prior practice in fashioning a piston ring to a normal (or unsprung) diameter equal to or slightly less than that of the cylinder bore to receive said ring and in depending solely on the expansive action upon the ring of a mixture undergoing compression by the piston or of the explosion products driving the piston, to establish sealing engagement of the ring with a cylinder wall. By thus avoiding reliance on the resilient nature of the ring to establish its sealing contact with the cylinder, it becomes feasible to use a considerably lighter ring than heretofore and to make the cross sectional area of the ring a constant from end to end of the ring. Also assembly in a cylinder of a piston equipped with my improved rings is considerably facilitated as compared with prior practice, since said rings require no compression to permit their insertion in the cylinder bore.

As the piston undergoes its downward stroke, the piston rings act to scrape any excess of lubricant from the cylinder wall, and it is desirable to continuously remove any such excess of lubricant from in advance of said rings to prevent such lubricant finding its way to the combustion chamber. Thus the ring farthest from the combustion chamber (and if desired, each of the rings) is formed adjacent to its wider end face with a plurality of circumferentially elongated slots 8 extending radially through the rings and any lubricant accumulating in advance of the ring may find its way through such slots into the grooves 3. That one of said grooves which is farthest from the combustion chamber has a lubricant discharge passage 9 leading therefrom through the piston wall, and if desired a similar passage may extend from each of the grooves 3.

To facilitate access of the lubricant to the slots 8 from in advance of the piston rings, on the explosion stroke of the piston, it is preferred to annularly cut away the outer faces of the rings from said slots to the wider end faces of the rings, as indicated at 10, whereby any lubricant accumulating in advance of said rings is delivered into said slots.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. The combination with a cylinder and a piston working in said cylinder, formed with an annular groove having an annularly stepped bottom, of a piston ring formed as a split annulus fitted in said groove and having its upper face stepped in complementary relation to the groove bottom, said ring having a normally unexpanded exterior diameter less than the diameter of the cylinder wall, and provided with means for transmitting lubricant from the cylinder wall to the interior of the ring when the ring is expanded by pressure from above the piston ring into engagement with said wall.

2. The combination of a cylinder and a piston working in said cylinder and formed with a peripheral groove, of a piston ring formed as a split annulus having its normal outside diameter slightly less than the diameter of the cylinder bore and its normal inside diameter greater than the distance between the opposite portions of the inner wall of said groove, whereby the ring will normally seat in said groove out of contact with both the cylinder wall and the inner wall of the piston groove, the upper and inner portions of said ring being arranged to be engaged by gases under pressure from within the cylinder to expand the ring into engagement with the cylinder wall, the central portion of the ring being provided with radial apertures, and the lower portion of the ring being arranged to scrape lubricant from the piston wall while the ring is expanded and guide such lubricant to said apertures.

In witness whereof I hereunto set my hand.

HORACE E. DEPUTY.